United States Patent
Schmidt et al.

(10) Patent No.: US 6,775,390 B1
(45) Date of Patent: Aug. 10, 2004

(54) HEADSET WITH MOVABLE EARPHONES

(75) Inventors: Peter Schmidt, Campbell, CA (US); Jeff Jones, Los Altos, CA (US); John Magnasco, San Jose, CA (US); Joseph Myatt, En Cintas, CA (US); Michael Wise, Los Altos, CA (US)

(73) Assignee: Hello Direct, Inc., San Jose, CA (US)

( * ) Notice: Subject to any disclaimer, the term of this patent is extended or adjusted under 35 U.S.C. 154(b) by 285 days.

(21) Appl. No.: 10/025,886

(22) Filed: Dec. 24, 2001

(51) Int. Cl.$^7$ .............................................. H04R 25/00
(52) U.S. Cl. ...................... 381/371; 381/370; 381/372; 381/375; 379/430; 181/128
(58) Field of Search .................. 381/370, 371, 381/372, 375; 379/430; 181/128, 129, 130, 135

(56) References Cited

U.S. PATENT DOCUMENTS

| | | | |
|---|---|---|---|
| 844,299 A | 2/1907 | Challen | |
| 1,489,978 A | 4/1924 | Byron | |
| 1,624,144 A | 4/1927 | Mathieu | |
| 1,846,231 A | 2/1932 | Susman | |
| 2,353,070 A | 7/1944 | Pitkin, Jr. | 179/156 |
| 2,964,596 A | 12/1960 | Christensen | 179/107 |
| 3,170,046 A | 2/1965 | Leale | 179/107 |
| 4,020,297 A | 4/1977 | Brodie | 179/156 A |
| 4,273,969 A | 6/1981 | Foley et al. | 179/156 A |
| D263,043 S | 2/1982 | Petrie | D14/36 |
| 4,335,281 A | 6/1982 | Scott et al. | 179/156 A |
| 4,403,120 A | 9/1983 | Yoshimi | 179/182 R |
| 4,417,104 A | 11/1983 | Langer | 179/107 R |
| 4,484,029 A | 11/1984 | Kenney | 179/2 EA |
| 4,572,324 A | 2/1986 | Fidi et al. | 181/129 |
| 4,668,842 A | 5/1987 | Yokoyama et al. | 381/183 |
| D291,197 S | 8/1987 | LaLanne | D14/36 |
| 4,689,822 A | 8/1987 | Houng | 381/183 |
| 4,720,857 A | 1/1988 | Burris et al. | 379/430 |

(List continued on next page.)

FOREIGN PATENT DOCUMENTS

| | | | |
|---|---|---|---|
| DE | 3210034 A1 | 9/1982 | H04R/1/10 |
| DE | 3210034 A * | 9/1982 | H04R/1/10 |
| EP | 0 690 654 A2 | 1/1996 | H04R/1/08 |
| JP | 04319841 | 11/1992 | H04M/1/05 |
| JP | 05079855 | 3/1993 | G01D/5/36 |
| WO | WO 95/30320 | 11/1995 | H04R/1/10 |
| WO | WO 96/02119 | 1/1996 | H04R/1/10 |
| WO | WO 97/27721 | 7/1997 | H04R/1/10 |

Primary Examiner—Suhan Ni
Assistant Examiner—Tuân Duc Nguyên
(74) Attorney, Agent, or Firm—Haverstock & Owens LLP

(57) ABSTRACT

A headset has one or two earpieces, an adjustable microphone boom, and a means for securing the headset to the user. The earpiece includes a speaker element for generating sound and a sound funneling device for funneling sound from the speaker element to an ear canal of the user. The sound funneling device rests within a concha and at the entrance of the ear canal for funneling sound and for stabilizing the earpiece against an ear of the user. In the preferred embodiment, the sound funneling device includes a first end which is open-ended and facing the speaker element, and a second end which includes one or more apertures and rests at the entrance of the ear canal. The first end has a circumference which is larger than a circumference of the second end which focuses the sound from the speaker element to the ear canal. A speaker cushion is configured to fit around the speaker element and the sound funneling device and preferably provides a means for coupling the speaker element to the sound funneling device. The speaker cushion is compressible to facilitate positioning the second end of the sound funneling device against the concha of the user's ear. A small speaker is mounted inside the speaker element. The headset is preferably secured to the user by a headband. The earpiece is coupled to the headband by a ball and socket joint integrally formed as part of the earpiece. The ball and socket design enables the earpiece to be easily maneuvered against the ear.

31 Claims, 3 Drawing Sheets

U.S. PATENT DOCUMENTS

| | | | |
|---|---|---|---|
| 4,830,139 A | 5/1989 | Cirillo | 181/130 |
| 4,875,233 A | 10/1989 | Derhaag et al. | 379/430 |
| 4,893,344 A | 1/1990 | Tragardh et al. | 381/187 |
| 4,917,504 A | 4/1990 | Scott et al. | 381/187 |
| 4,965,838 A | 10/1990 | Kamon et al. | 381/187 |
| 4,972,468 A | 11/1990 | Murase et al. | 379/430 |
| 4,972,492 A | 11/1990 | Tanaka et al. | 381/187 |
| D317,610 S | 6/1991 | Jahnke | D14/223 |
| D318,053 S | 7/1991 | Ludeke et al. | D14/206 |
| D318,669 S | 7/1991 | Nakayama | D14/205 |
| 5,033,094 A | 7/1991 | Hung | 381/183 |
| D319,241 S | 8/1991 | Daido et al. | D14/205 |
| 5,117,465 A | 5/1992 | MacDonald | 381/187 |
| D327,888 S | 7/1992 | Fitzgerald | D14/147 |
| 5,142,587 A | 8/1992 | Kobayashi | 381/187 |
| D331,057 S | 11/1992 | Isonaga | D14/205 |
| D331,059 S | 11/1992 | Sogabe et al. | D14/205 |
| D331,408 S | 12/1992 | Ellermeier | D14/205 |
| D333,137 S | 2/1993 | Burke | D14/206 |
| 5,206,997 A | 5/1993 | Cunningham | 30/120.4 |
| 5,210,792 A | 5/1993 | Kajihara | 379/430 |
| D340,722 S | 10/1993 | Bungardt | D14/242 |
| D344,730 S | 3/1994 | Gattey et al. | D14/206 |
| D345,162 S | 3/1994 | Yamatogi | D14/205 |
| D350,354 S | 9/1994 | Nakamura | D14/205 |
| D351,598 S | 10/1994 | Nakamura | D14/205 |
| D353,379 S | 12/1994 | Nakamura et al. | D14/223 |
| 5,381,486 A | 1/1995 | Ludeke et al. | 381/187 |
| 5,390,254 A | 2/1995 | Adelman | 381/68 |
| D357,479 S | 4/1995 | Coomans | D14/223 |
| D358,388 S | 5/1995 | Nakamura et al. | D14/205 |
| D358,391 S | 5/1995 | Isono | D14/205 |
| 5,412,736 A | 5/1995 | Keliiliki | 381/187 |
| 5,414,769 A | 5/1995 | Gattey et al. | 379/430 |
| D361,066 S | 8/1995 | Langhorn et al. | D14/142 |
| 5,438,626 A | 8/1995 | Neuman et al. | 381/183 |
| 5,446,788 A | 8/1995 | Lucey et al. | 379/430 |
| 5,448,637 A | 9/1995 | Yamaguchi et al. | 379/430 |
| 5,450,496 A | 9/1995 | Burris et al. | 381/183 |
| D363,487 S | 10/1995 | Thurnau | D14/224 |
| 5,459,290 A | 10/1995 | Yamagishi | 181/129 |
| 5,469,505 A | 11/1995 | Gattey et al. | 379/430 |
| D366,486 S | 1/1996 | Runquist et al. | D14/206 |
| D368,716 S | 4/1996 | Shudo | D14/205 |
| 5,504,812 A | 4/1996 | Vangarde | 379/430 |
| D371,133 S | 6/1996 | Andrea | D14/206 |
| 5,528,689 A | 6/1996 | Chan | 379/430 |
| 5,533,122 A | 7/1996 | Gattey et al. | 379/430 |
| D372,473 S | 8/1996 | Bungardt | D14/149 |
| D372,480 S | 8/1996 | Bungardt | D14/247 |
| D374,011 S | 9/1996 | Baxter | D14/206 |
| 5,551,090 A | 9/1996 | Thompson | 2/209 |
| D375,313 S | 11/1996 | Jensen et al. | D14/206 |
| D375,500 S | 11/1996 | Bungardt et al. | D14/223 |
| D375,959 S | 11/1996 | Davis et al. | D14/223 |
| D376,362 S | 12/1996 | Bozorgi-Ram | D14/205 |
| D376,598 S | 12/1996 | Hayashi | D14/206 |
| D377,020 S | 12/1996 | Bungardt et al. | D14/205 |
| 5,581,622 A | 12/1996 | Sakurai | 381/183 |
| 5,590,213 A | 12/1996 | Urella et al. | 381/183 |
| D379,990 S | 6/1997 | Bungardt et al. | D14/228 |
| 5,640,458 A | 6/1997 | Nishiguchi et al. | 381/74 |
| D381,336 S | 7/1997 | Bungardt et al. | D14/205 |
| D381,646 S | 7/1997 | Taylor et al. | D14/124 |
| D381,987 S | 8/1997 | Tsuge | D14/205 |
| 5,655,026 A | 8/1997 | Peters et al. | 381/187 |
| D384,958 S | 10/1997 | Shudo | D14/206 |
| D385,272 S | 10/1997 | Jensen et al. | D14/142 |
| 5,694,467 A | 12/1997 | Young, III | 379/430 |
| 5,757,944 A | 5/1998 | Jensen et al. | 381/187 |
| 5,761,298 A | 6/1998 | Davis et al. | 379/430 |
| 5,764,778 A | 6/1998 | Zurek | 381/68 |
| 5,787,166 A | 7/1998 | Ullman | 379/430 |
| 5,953,435 A | 9/1999 | Mullin et al. | 381/380 |
| 6,320,960 B1 | 11/2001 | Lathrop, III et al. | 379/430 |

\* cited by examiner

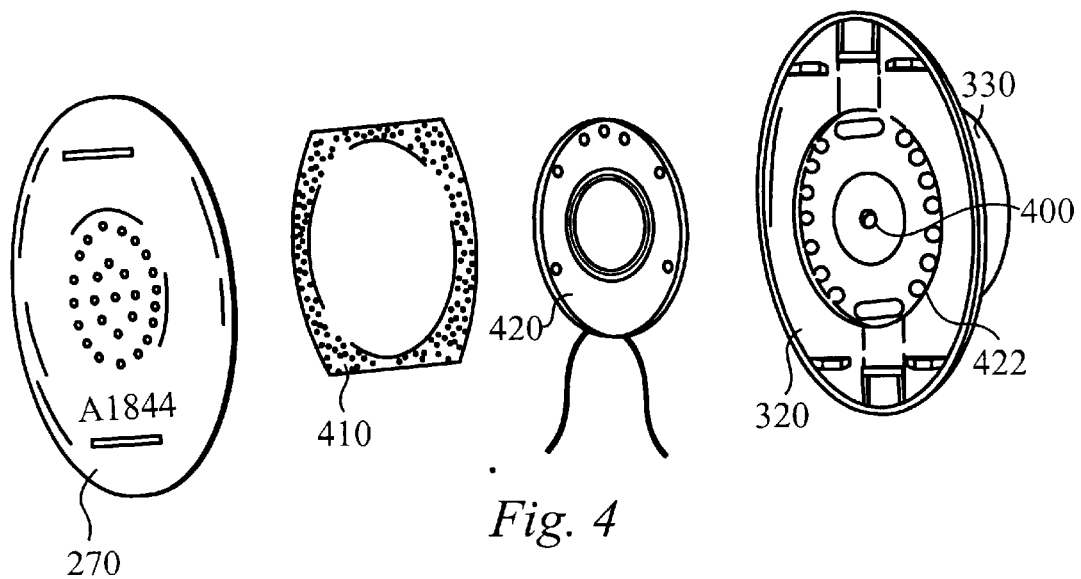
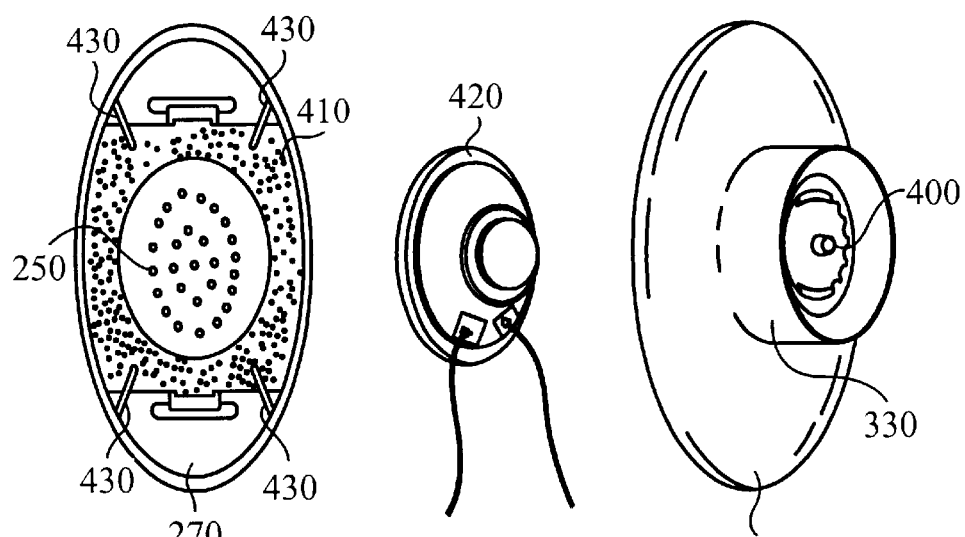

HEADSET WITH MOVABLE EARPHONES

FIELD OF THE INVENTION

The present invention relates to the field of headsets. More specifically, the present invention relates to the field of over-the-head headsets.

BACKGROUND OF THE INVENTION

Many different headset devices have been used to position and stabilize an audio transducer adjacent to a user's ear. The audio transducer or speaker is positioned adjacent to a user's ear in order to deliver audio communication to the user. In headsets used for telephonic or other similar type communications, a microphone is also positioned in the vicinity of the user's mouth, usually by a tubular extension, voice tube or boom, for receiving the user's voice and transmitting it over the communications link. Objectives of headset design are the quality of the audio reception, and the comfort and convenience of the user.

Communications headsets commonly include either one or two audio transducers so as to transmit the auditory signals to one or both ears of the user. Most of the prior art headsets include an over-the-head band designed to be worn over a user's head for positioning a pair of speakers adjacent to each of the user's ears. Typically, earpieces are designed which consist of speakers covered by a type of cushion. The speakers are designed to rest against the outside ear, or pinna, of the user. The concept behind these devices is to create a seal between the earpiece and the ear, the tighter the seal the less sound leaks away before reaching the ear. A disadvantage of the headband style headset is that the earpieces often are knocked askew and lose their seal. A motion as simple as turning one's head may be sufficient to move the earpiece away from the user's ear.

Sealing around the ear is also a well known principle in headset design, as illustrated by the headsets worn by airline pilots. In either the case of sealing the headset around the ear or sealing the headset against the ear, the sealing action creates a cavity between the earpiece and the ear canal. The disadvantage in creating the cavity is that the larger the cavity, the more sound is distorted and the user's perception of the sound is altered.

Single earpiece transducer headsets are either worn using a headband or are worn over the ear. The headband style using a single earpiece possesses the same disadvantages as the dual earpiece style. The single transducer headsets that are worn over the ear are often more comfortable and convenient, however, their ability to create a seal between the earpiece and the ear is less effective than that of the headband style.

Conventional intra-concha style headsets position the audio transducer inside the lower concha of the ear. However, different ear shapes and sizes make it difficult for a single design to both fit a user's ear correctly and stabilize the headset. Additionally, for the intra-concha headsets to be effective, the audio transducer needs to be lodged into the concha. Positioning the transducer in such a fashion is not only uncomfortable but tends to make the transducer become easily dislodged.

What is needed is an earpiece which provides a tight seal to minimize sound leakage, a seal created as near the ear canal as possible as to minimize the size of the seal cavity, and a means to laterally stabilize the earpiece as to prevent breaking of the seal.

SUMMARY OF THE INVENTION

A headset has one or two earpieces, an adjustable microphone boom, and a means for securing the headset to the user. The earpiece includes a speaker element for generating sound and a sound funneling device for funneling sound from the speaker element to an ear canal of the user. The sound funneling device rests within a concha and at the entrance of the ear canal for funneling sound and for stabilizing the earpiece against an ear of the user. In the preferred embodiment, the sound funneling device includes a first end which is open-ended and facing the speaker element, and a second end which includes one or more apertures and rests at the entrance of the ear canal. The first end has a circumference which is larger than a circumference of the second end which focuses the sound from the speaker element to the ear canal.

A speaker cushion is configured to fit around the speaker element and the sound funneling device and preferably provides a means for coupling the speaker element to the sound funneling device. The speaker cushion is compressible to facilitate positioning the second end of the sound funneling device within the concha of the user's ear.

The speaker element preferably has a front cover and a back cover. The front cover and the back cover are coupled together where a small speaker is mounted inside the speaker element and faces an inner surface of the front cover. The front cover is configured with tiny openings to allow sound to pass from the small speaker through the front cover of the speaker element. The back cover includes one or more apertures configured to effectively increase the size of a speaker back cavity for minimizing low frequency attenuation.

The headset is preferably secured to the user by a headband. The earpiece is coupled to the headband by a ball and socket joint integrally formed as part of the earpiece. The ball and socket design enables the earpiece to be easily maneuvered against the ear.

BRIEF DESCRIPTION OF THE DRAWINGS

FIG. 4 illustrates a front perspective view of the internal structure of the speaker module according to the preferred embodiment of the present invention.

FIG. 5 illustrates a rear perspective view of the internal structure of the speaker module according to the preferred embodiment of the present invention.

DETAILED DESCRIPTION OF A PREFERRED EMBODIMENT

Although the description of the headset of the present invention will focus on a headset configured to couple to a telephone, the description is equally applicable to a headset configured to couple to other electrical devices, e.g., a communication device generating electrical signals corresponding to sound waves.

The present invention includes a headset having one or two earpieces, an adjustable microphone boom, and a means for securing the headset to a user. The earpiece is designed to fit against a pinna of an ear of the user. The preferred embodiment of the present invention includes two earpieces, one earpiece to be fitted against each ear of the user. The earpieces are coupled to a headband for securing the headset to the user. In an alternative embodiment, only one earpiece is used where the earpiece is secured to the head of the user by a headband. In the alternative embodiment, the earpiece can be worn over either the left ear or the right ear.

Figure 1:
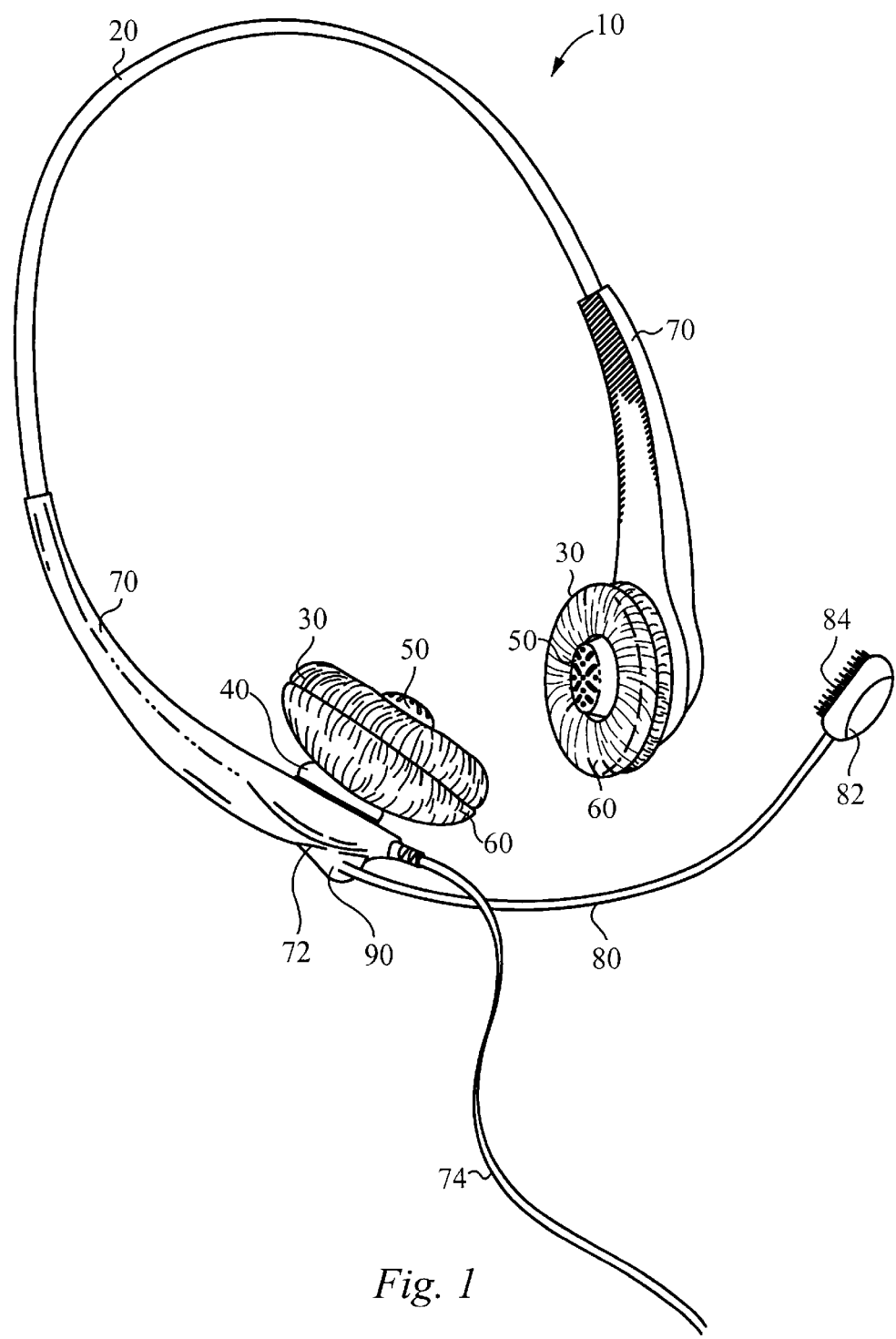
FIG. 1 illustrates a perspective view of the headset according to the preferred embodiment of the present invention.

Referring to FIG. 1, a headset 10 in accordance with the preferred embodiment of the present invention is illustrated. A headband 20 resiliently joins a pair of earpieces 30. Each earpiece includes a speaker module 40, a sound funneling device 50 and a speaker cushion 60. The speaker cushion 60 is made of foam or other soft material. A strain relief or collar 70 fits over either end region of the headband 20 for additional support. The headband 20 can slide within the collar 70. An aperture is provided in the collar 70 for coupling the speaker module 40 to the collar 70, as discussed below.

The headset includes a microphone boom 80 coupled to the collar 70. A swivel plate 90 rotates on the collar 70 within a collar aperture 72. The microphone boom 80 is integrally molded with the swivel plate 90 at a first end. Preferably, a microphone (not shown) is enclosed in a hollow shell 82, the hollow shell 82 is coupled to a second end of the microphone boom 80. The hollow shell 82 is covered on a surface with a foam shield 84 which protrudes outwardly from the surface. The microphone boom 80 is configured to be selectively adjustable so that the hollow shell 82 is positioned adjacent to a mouth of the user for speaking into the microphone when the headset 10 is properly worn. The microphone boom 80 can rotate from the position shown in FIG. 1 upwards past the headband 20 and over to the other side. This allows the headset to be used with the microphone boom 80 and a flexible cabling jacket 74 on either the right or on the left side of the user's head.

The flexible cabling jacket 74 is coupled to the collar 70. The flexible cabling jacket 74 includes a first pair of wires coupled to the microphone enclosed within the hollow shell 82 and a second pair of wires coupled to the earpiece 30. The flexible cabling jacket 74 can be terminated with any appropriate connector, e.g., male type or female type. The first pair of wires and the second pair of wires deliver appropriate signals to the microphone and the earpiece, respectively.

Figure 2:
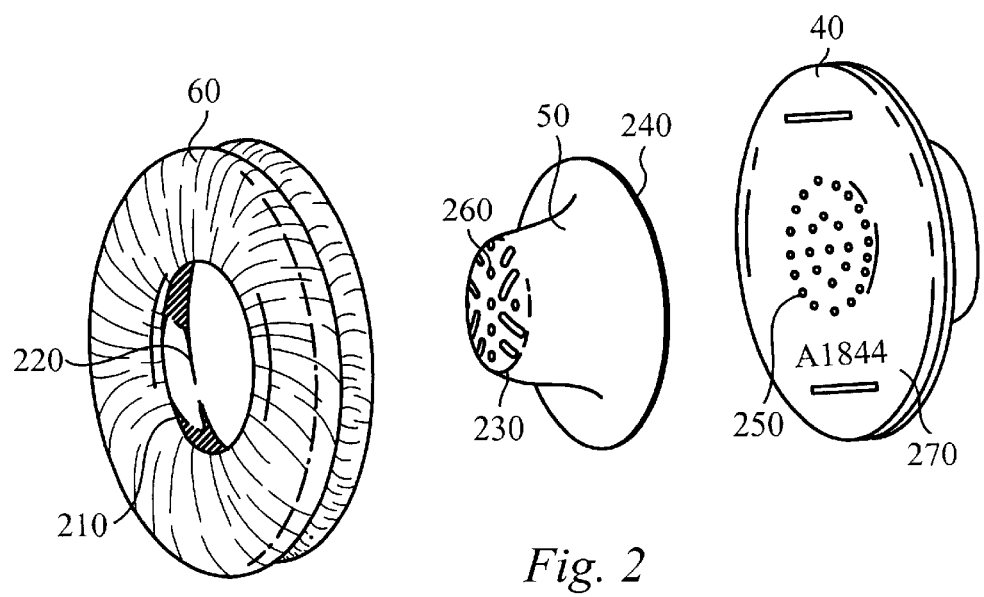
FIG. 2 illustrates a front perspective view of the internal structure of the earpiece according to the preferred embodiment of the present invention.
Figure 3:
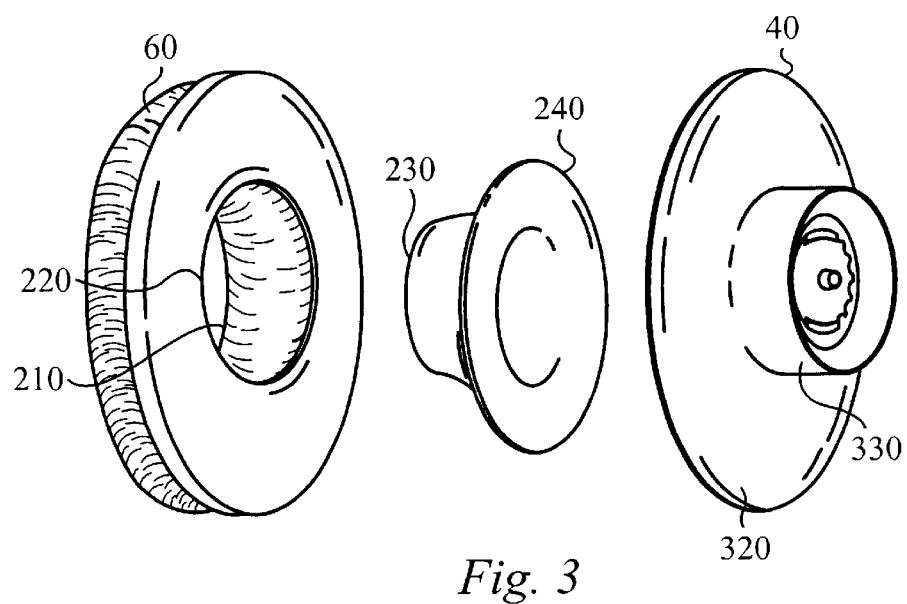
FIG. 3 illustrates a rear perspective view of the internal structure of the earpiece according to the preferred embodiment of the present invention.

FIGS. 2 and 3 illustrate the disassembled earpiece 30 according to the preferred embodiment of the present invention. Specifically, FIG. 2 illustrates a front perspective view of the disassembled earpiece 30, and FIG. 3 illustrates a rear perspective view of the disassembled earpiece 30. The earpiece 30 preferably includes the speaker module 40, the sound funneling device 50 coupled to the speaker module 40, and the speaker cushion 60 configured to fit around the speaker module 40 and the sound funneling device 50. The speaker module 40 includes one or more apertures 250 for outputting sound. The sound funneling device 50 is preferably trumpet-shaped having a first end 230 and a second end 240. The first end 230 preferably includes one or more apertures 260. The apertures 260 form a pattern such that the first end 230 is relatively transparent to sound. In other words, sound attenuation through the first end 230 is almost non-existent. The second end 240 is preferably open-ended and is coupled to the speaker module 40. The speaker module 40 includes a front cover 270 and a back cover 320 coupled to the front cover 270. The front cover 270 includes the one or more apertures 250 for outputting sound. The circumference of the second end 240 is sufficiently large as to completely cover all of the apertures 250. In this manner, all sound output through the apertures 250 enters the sound funneling device 50. The circumference of the second end 240 is also larger than a circumference of the first end 230. It is the difference in the circumferences of the first end 230 and the second end 240 that enables the sound funneling device 50 to amplify the effects of a pinna of the user. The sound funneling device 50 effectively focuses sound into the ear canal. In the prior art, an earpiece is pressed against the ear of the user. The earpiece outputs sound and it is left to the pinna of the user's ear to funnel the sound into the ear canal. The sound funneling device 50 of the present invention provides a more efficient energy coupling between the earpiece 30 and the ear canal of the user. The larger opening of the second end 240 funnels the sound energy received from the apertures 250 into the smaller opening of the first end 230 thereby outputting the sound directly into the ear canal of the user.

The speaker cushion 60 is soft and compressible for providing comfort to the user. The compressible nature of the speaker cushion 60 also enables the earpiece 30 to create a seal with the ear of the user. The seal is created when the earpiece 30 is compressed against the pinna of the user. Creating a seal between the earpiece 30 and the pinna is a common practice, as discussed previously. Leakage occurs when air is able to pass between an earpiece and a pinna. Since sound is essentially a series of air pressure waves, the prevention of leakage is a primary concern in the design of headsets. When a seal is broken, air leaks out of a cavity that had been created between the earpiece and the ear. As air leaks out, the low frequency sound waves become attenuated or lost altogether. This results in a trebly sound, which is a distorted version of the original rich, full sound. In voice sound waves, much of the power resides in the low frequencies, so leakage can greatly distort voice sound waves. Therefore, a conventional principle in the design of earpieces is to create as secure a seal as possible. A secure seal not only prevents internal sound from leaking out but prevents external sounds from entering.

The speaker cushion 60 has a first opening 210 which is located on a front side of the speaker cushion 60, the front side faces the ear of the user. The circumference of the first opening 210 is larger than the circumference of the first end 230 of the sound funneling device 50, but smaller than the circumference of the second end 240 of the sound funneling device 50. Such a configuration allows the first end 230 to pass through the first opening 210, but prohibits the second end 240 from passing through the first opening 210 thereby securing the sound funneling device 50 into place.

The speaker cushion 60 has a second opening 220 which is located on a rear side of the speaker cushion 60, the rear side faces the collar 70. The rear of the cushion is made of material sufficiently elastic as to stretch the second opening 220 to permit the sound funneling device 50 and the speaker module 40 to pass through. In a relaxed state, a circumference of the second opening 220 is smaller than a circumference of the speaker module 40 thereby securing the speaker module 40 within the cushion. The back cover 320 of the speaker module 40 is curved and includes a protruding portion 330. The protruding portion is preferably oval-shaped and extends away from the surface of the back cover 320. A circumference of the protruding portion 330 is smaller than the relaxed condition circumference of the second opening 220. The protruding portion 330 extends through the second opening 220 of the speaker cushion 60.

In the preferred embodiment, the first end 230 of the sound funneling device 50 passes through the first opening 210 of the speaker cushion 60 and protrudes slightly beyond a surface of the front side of the speaker cushion 60. When the earpiece 30 is compressed against a pinna, the speaker cushion 60 creates a seal with the pinna, and the first end 230 extends into the concha and rests against the entrance of the ear canal. The placement of the first end 230 at the entrance of the ear canal provides enhanced sound coupling to the ear by sealing the acoustical system directly with the ear canal. Such a placement of the first end 230 also provides enhanced lateral stability to prevent sliding of the earpiece 30. The apertures 260 enable the first end 230 to flex in a collapsing action, without blocking the sound, to provide further stabilization and comfort to the user. The sound funneling device 50 may be viewed as an ear cushion insert which is removable.

In an alternative embodiment, the first end 230 of the sound funneling device 50 is open-ended. Since there are no apertures 260, there is no sound attenuation. However, the lack of apertures 260 minimizes the ability for the front end 230 to flex. This reduced flexing action does not provide as comfortable a fit for the user.

FIGS. 4 and 5 illustrate the disassembled speaker module 40 according to the preferred embodiment of the present invention. Specifically, FIG. 4 illustrates a front perspective view of the disassembled speaker module 40, and FIG. 5 illustrates a rear perspective view of the disassembled speaker module 40. The speaker module 40 is coupled to the collar 70 by a ball and socket joint 400 so that the earpiece 30 can be positioned properly against the ear of the user.

The speaker module 40 preferably includes the front cover 270, a foam gasket 410, a speaker 420, and the back cover 320. The front cover 270 includes stabilizers 430 which are integrally formed on the inner surface of the flat cover 310, as illustrated in FIG. 5. The foam gasket 410 is positioned flush against the inner surface of the flat cover 310. The foam gasket 410 is configured as to not cover the stabilizers 430 nor the apertures 250. Preferably, the foam gasket 410 includes a centrally located, circular void as to prevent the apertures 250 from being covered by any portion of the foam gasket 410. The speaker 420 rests against the foam gasket 410. Preferably, the circumferential edge of the speaker 420 is flush with an end of each stabilizer 430. A circumference of the speaker 420 is small enough as to permit the circumferential edge of the speaker 420 to rest within the stabilizers 430. The circumference of the speaker 420 is larger than a circumference of the circular void of the foam gasket 410. In this manner, the stabilizers 430 laterally stabilize the speaker 420, and the foam gasket 410 effectively shock mounts the speaker 420 and seals the edge of the speaker 420.

The back cover 320 includes a plurality of apertures 422, as illustrated in FIG. 4. The apertures 422 are positioned within the protruding portion 330 of the back cover 320. The pattern of the apertures 422 is acoustically designed to shape the frequency response by effectively raising the back volume behind the speaker 420. By raising the back volume, the low frequency performance of the speaker 420 is enhanced. The enhancement is due to the fact that low frequency sound waves push a large amount of air relatively slowly, this generates a big compression. A small back volume behind the speaker 420 will tend to resist the big compression and in effect dampen the diaphragm of the speaker 420 so as not to compress as much air. This diminished compression attenuates the lower frequencies. The apertures 422 effectively increase the back volume behind the speaker 420 to help offset the attenuation of the lower frequencies.

The speaker 420 generates sound which is output through the apertures 250 and into the second end 240 of the sound funneling device 50. The sound is funneled from the second end 240 out through the first end 230. Since the first end 230 rests against the ear canal of the user, the sound is output directly from the first end 230 to the ear canal. As previously discussed, conventional headphones form a seal between the earpiece and the ear thereby forming a cavity between the speaker element and the ear canal. The sound waves become distorted while passing through the cavity. Additionally, the sound waves are not funneled directly to the ear canal, the sound waves are passed from the speaker element into the cavity. As such, a percentage of the sound waves will be lost due to leakage before they reach the ear canal. In contrast, the present invention minimizes the size of the cavity by positioning the first end 230 of the sound funneling device 50 at the entrance of the ear canal. Therefore, the sound waves are funneled from the speaker module 40 to the ear canal. In this manner, the distortion effects of the cavity and the sound leakage are minimized. Additionally, since the sound funneling device 50 laterally stabilizes the earpiece 30 against the ear, occurrences of the seal being broken are reduced and leakage is further minimized.

What is claimed is:

1. A headset comprising:
  a. means for securing the headset to a user;
  b. a microphone boom coupled to the means for securing wherein the microphone boom is adjustable with respect to the means for securing; and
  c. one or more earpieces adjustably coupled to the means for securing wherein the earpiece includes a speaker element for generating sound and a sound funneling device for funneling sound from the speaker element to an ear canal of the user and wherein the means for securing is an adjustable headband; and
  d. a donut-shaped speaker cushion with a hole extending through a middle section of the speaker cushion to fit around the speaker element and the sound funneling device.

2. The headset as claimed in claim 1 wherein the sound funneling device includes a first end coupled to the speaker element for receiving the sound generated by the speaker element and a second end, wherein the second end includes one or more apertures for outputting the sound received by the first end to the ear canal.

3. The headset as claimed in claim 2 wherein a circumference of the second end of the sound funneling device is less than a circumference of the first end of the sound funneling device.

4. The headset as claimed in claim 3 wherein the first end of the sound funneling device is open-ended.

5. The headset as claimed in claim 4 wherein the second end of the sound funneling device rests within a concha and at the entrance of the ear canal for stabilizing the earpiece against an ear of the user.

6. The headset as claimed in claim 5 wherein the second end of the funneling device flexes in a collapsing action for stabilizing the earpiece against the ear of the user.

7. The headset as claimed in claim 2 wherein the speaker cushion is compressible to facilitate positioning the second end of the sound funneling device within a concha of the user's ear.

8. The headset as claimed in claim 7 wherein the speaker cushion provides a means for coupling the speaker element to the sound funneling device.

9. The headset as claimed in claim 1 further comprising a cable coupled to the means for securing, wherein the cable includes one or more wires for enabling electrical communication between the headset and an electrical device.

10. The headset as claimed in claim 1 wherein the microphone boom comprises:
   a. a boom including longitudinal boom wires and a longitudinal tunnel contained within an elongated insulating sheath; and
   b. a microphone element coupled to a distal end of the boom and having a microphone housing and a microphone mounted within the microphone housing, wherein the microphone element is appropriately positioned next to a mouth of the user by adjusting the boom.

11. The headset as claimed in claim 1 wherein the earpiece is coupled to the means for securing by a ball and socket joint.

12. The headset as claimed in claim 1 wherein the speaker element comprises:
   a. a speaker housing having a front cover and a back cover, wherein the front cover faces the ear when the headset is positioned on the ear; and
   b. a speaker mounted within the speaker housing, wherein the speaker faces an inner surface of the front cover.

13. The headset as claimed in claim 12 wherein the back cover of the speaker housing includes one or more apertures configured to effectively increase the size of a speaker back cavity for minimizing low frequency attenuation.

14. A headset comprising:
   a. means for securing the headset to a user;
   b. a microphone boom coupled to the means for securing wherein the microphone boom is adjustable with respect to the means for securing;
   c. one or more earpieces adjustably coupled to the means for securing wherein the earpiece includes a speaker element for generating sound and a sound funneling device for funneling sound from the speaker element to an ear canal of the user, wherein the sound funneling device includes a first end coupled to the speaker element for receiving sound generated by the speaker element and a second end, wherein the second end includes one or more apertures for outputting the sound received by the first end to the ear canal and wherein the means for securing is an adjustable headband; and
   d. a donut-shaped speaker cushion with a hole through a middle section of the speaker cushion to fit around the speaker element and the sound funneling device.

15. The headset as claimed in claim 14 wherein a circumference of the second end of the sound funneling device is less than a circumference of the first end of the sound funneling device, further wherein the second end is rests within a concha and at the entrance of the ear canal for stabilizing the earpiece against the ear of the user.

16. The headset as claimed in claim 15 wherein the first end of the sound funneling device is open-ended.

17. The headset as claimed in claim 16 wherein the second end of the sound funneling device flexes in a collapsing action for stabilizing the earpiece against the ear of the user.

18. The headset as claimed in claim 17 wherein the speaker cushion is compressible to facilitate positioning the second end of the sound funneling device within a concha of the user's ear, further wherein the speaker cushion provides a means for coupling the speaker element to the sound funneling device.

19. The headset as claimed in claim 18 further comprising a cable coupled to the means for securing, wherein the cable includes one or more wires for enabling electrical communication between the headset and an electrical device.

20. The headset as claimed in claim 19 wherein the microphone boom comprises:
   a. a boom including longitudinal boom wires and a longitudinal tunnel contained within an elongated insulating sheath; and
   b. a microphone element coupled to the boom and having a microphone housing and a microphone mounted within the microphone housing, wherein the microphone element is appropriately positioned next to a mouth of the user by adjusting the boom.

21. A headset comprising:
   a. means for securing the headset to a user;
   b. a microphone boom coupled to the means for securing wherein the microphone boom is adjustable with respect to the means for securing;
   c. one or more earpieces adjustably coupled to the means for securing wherein the earpiece includes a speaker element for generating sound and a sound focusing device for focusing sound from the speaker element to an ear channel of the user, wherein the sound focusing device includes a first end coupled to the speaker element for receiving sound generated by the speaker element and a second end, wherein the second end includes one or more apertures for outputting the sound received by the first end into the ear channel and whereby a circumference of the second end is less than a circumference of the first end and wherein the means for securing is an adjustable headband; and
   d. a donut-shaped speaker cushion with a hole through a middle section of the speaker cushion to fit around the speaker element and the sound focusing device.

22. The headset as claimed in claim 21 wherein the first end of the sound focusing device is open-ended, further wherein the circumference of the second end of the sound focusing device rests within a concha and at the entrance of the ear canal for stabilizing the earpiece against the ear of the user.

23. The headset as claimed in claim 22 wherein the second end of the sound focusing device flexes in a collapsing action for stabilizing the earpiece against the ear of the user.

24. The headset as claimed in claim 23 wherein the speaker cushion is compressible to facilitate positioning the second end of the sound focusing device within the concha of the user's ear, further wherein the speaker cushion provides a means for coupling the speaker element to the sound focusing device.

25. The headset as claimed in claim 24 further comprising a cable coupled to the means for securing, wherein the cable includes one or more wires for enabling electrical communication between the headset and an electrical device.

26. The headset as claimed in claim 25 wherein the microphone boom comprises:
   a. a boom including longitudinal boom wires and a longitudinal tunnel contained within an elongated insulating sheath; and
   b. a microphone element coupled to the boom and having a microphone housing and a microphone mounted within the microphone housing, wherein the microphone element is appropriately positioned next to a mouth of the user by adjusting the boom.

27. A headset comprising:
   a. means for securing the headset to a user;
   b. a microphone boom coupled to the means for securing wherein the microphone boom is adjustable with respect to the means for securing;

c. means for generating sound wherein the means for generating is coupled to the means for securing;

d. means for focusing the sound from the means for generating to an ear canal of the user, wherein the means for focusing is coupled to the means for generating and wherein the means for securing is an adjustable headband; and e. a donut-shaped speaker cushion with a hole extending through a middle section of the speaker cushion to fit around a speaker element and a sound focusing device, wherein the sound is generated by the speaker element and focused by the sound focusing device.

28. The headset as claimed in claim 27 wherein the sound focusing device includes a first end for receiving the sound from the means for generating sound and a second end for outputting the sound received by the first end to the ear canal.

29. The headset as claimed in claim 28 wherein the first end of the sound focusing device is open-ended and the second end includes one or more apertures, further wherein a circumference of the second end is less than a circumference of the first end.

30. The headset as claimed in claim 28 wherein the speaker cushion is compressible to facilitate positioning the second end of the sound focusing device within a concha of the user's ear.

31. The headset as claimed in claim 30 further comprising means for stabilizing the earpiece with the ear of the user.

* * * * *